United States Patent [19]

Chen

[11] Patent Number: 4,991,457

[45] Date of Patent: Feb. 12, 1991

[54] SHIFT BOOT SUPPORT AND BEZEL ARRANGEMENT

[75] Inventor: Benjamin S. Chen, Birmingham, Mich.

[73] Assignee: Chrysler Corporation, Highland Park, Mich.

[21] Appl. No.: 522,755

[22] Filed: May 14, 1990

[51] Int. Cl.$^5$ .......................... G05G 9/00; F16J 15/52
[52] U.S. Cl. ........................ 74/473 R; 74/18;
74/558.5; 277/212 FB; 464/175
[58] Field of Search ............. 74/18, 18.1, 18.2, 473 R,
74/558.5, 473 P; 277/212 FB; 464/175

[56] References Cited

U.S. PATENT DOCUMENTS

| | | | |
|---|---|---|---|
| 2,620,208 | 12/1952 | Patch et al. | 74/18 |
| 3,022,673 | 2/1962 | McCordic | 74/473 R |
| 3,064,493 | 11/1962 | Popovich et al. | 74/473 R |
| 3,926,068 | 12/1975 | Jantzen et al. | 74/473 R |
| 4,018,099 | 4/1977 | O'Brien et al. | 74/473 R |
| 4,522,081 | 6/1985 | Mackin et al. | 74/18.1 |
| 4,557,491 | 12/1985 | Orain | 277/212 FB |
| 4,581,951 | 4/1986 | Watson | 74/473 R |
| 4,617,834 | 10/1986 | Foggini | 74/523 |
| 4,793,620 | 12/1988 | Karch | 74/558 |

FOREIGN PATENT DOCUMENTS 2658274 7/1977 Fed. Rep. of Germany .... 74/473 R
0203834 12/1986 Japan ..................... 74/473 P Primary Examiner—Leslie A. Braun
Assistant Examiner—Winnie Yip
Attorney, Agent, or Firm—Edward P. Barthel

[57] ABSTRACT

An inner seal boot, outer support boot cover, and bezel frame arrangement for enclosing the gap between the movable shift lever and an opening through which the lever of a vehicle transmission passes. The one-piece rubber boot cover has an upper conical-shaped sheath portion, an intermediate frusto-conical shaped flexible bellows portion, and a lower composite laminated base portion sealing enclosing a substrate core of thin sheet metal. The bellows portion has its lowermost convolute terminating in a groove defined in part by the substrate core with the groove dimensioned for releasable locking engagement of the bezel frame rectangular opening.

4 Claims, 3 Drawing Sheets

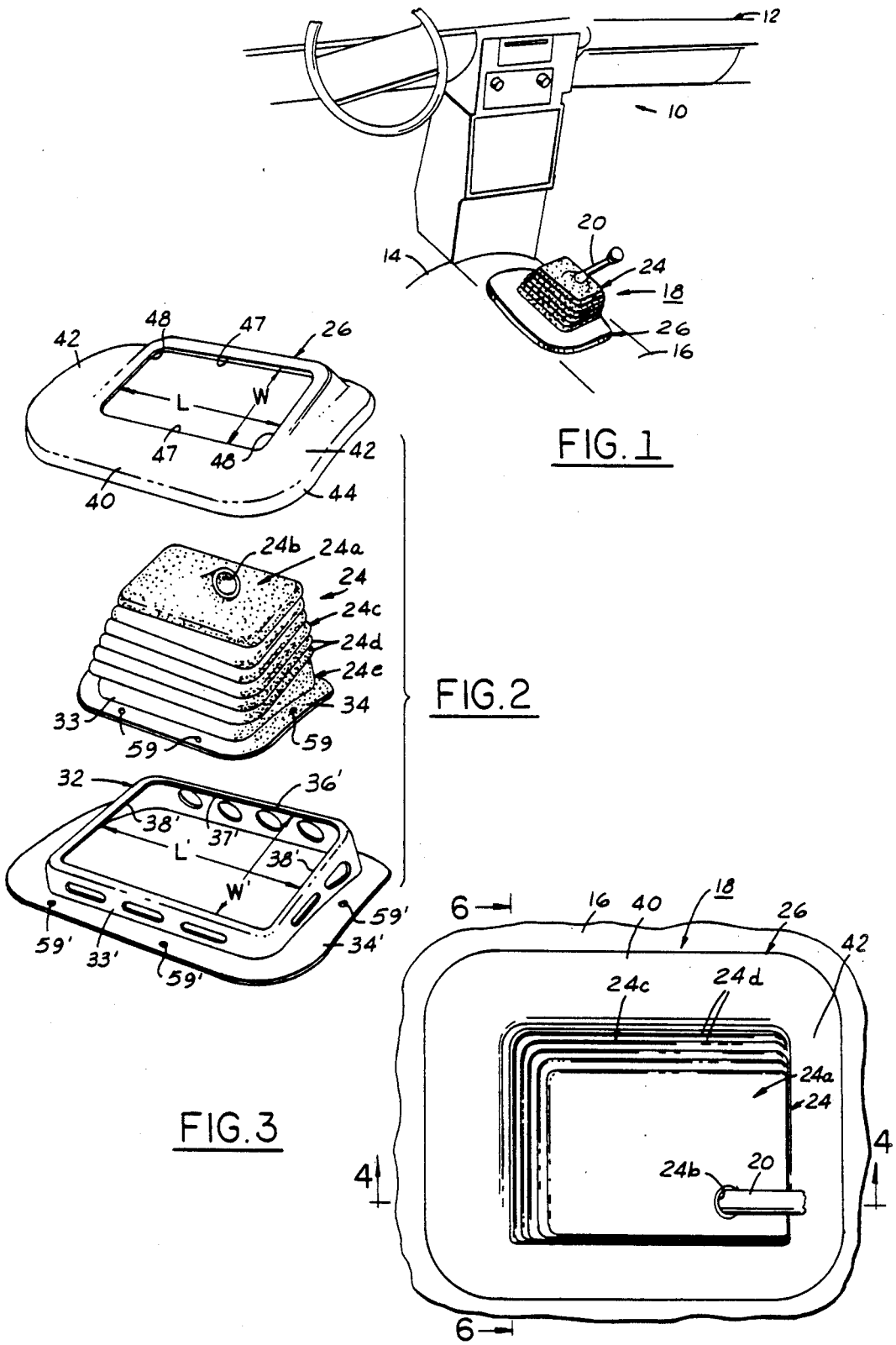

SHIFT BOOT SUPPORT AND BEZEL ARRANGEMENT

BACKGROUND OF THE INVENTION

This invention relates generally to an enclosure boot for an automobile floor-mounted gear shift lever and, more particularly, to an improved support boot cover and bezel frame attachment arrangement to enclose the gap between the movable lever and an opening in the vehicle floor pan through which the lever passes.

An example of a prior art boot cover for a floor-mounted transmission is shown in U.S. Pat. No. 4,522,081 issued June 11, 1985 to Mackin et al. The Mackin et al. patent discloses a boot cover for enclosing a pivotally mounted automobile transmission shift lever having converging sidewalls formed in part by a plurality of spherically shaped surfaces which support rolling contact between adjacent surfaces during shifting of the shift lever from the neutral position.

The U.S. Pat. No. 4,018,099 issued Apr. 19, 1977 to O'Brien et al. provides an incidental disclosure of still another type of boot cover and bezel arrangement for enclosing a automobile shift linkage control.

The U.S. Pat. No. 3,926,068 issued Dec. 16, 1975 to Jantzen et al. provides still another incidental disclosure of a shift lever ball member arranged between two approximately hemispherically shaped rubber sleeves and a boot type rubber sleeve for covering the entire joint-like lead-through assembly.

The U.S. Pat. No. 4,617,834 issued Oct. 21, 1986 to Foggini shows a one piece covering comprising a center sheath enclosing the shift lever and terminated at one end with a knob grip which includes a lever check seat, and at the other end with a bellows seal formed with a groove adapted to cooperate with a mating check seat provided in a vehicle console.

SUMMARY OF THE INVENTION

It is an object of the present invention to provide a support boot cover and bezel frame attachment arrangement for an automotive floor-mounted shift lever which is substantially easier, faster, and more economical to install and disassemble than previously known protective boots.

It is another object of the present invention to provide a support boot cover and bezel frame attachment arrangement for an automotive floor-mounted pivotable gear shift lever which substantially reduces the number of parts required during the assembly of a motor vehicle, especially on a mass production basis.

The present invention provides a shift lever support boot cover and bezel frame arrangement for enclosing a floor-mounted pivotable automotive transmission gear shift lever which lever extends through an opening in a vehicle floor pan such as an upper wall of a console or drive line tunnel. The elastomeric one-piece boot cover has an upper flexible conical-like sheath portion tapering upwardly to a shift lever opening, an intermediate generally frusto-conical flexible bellows portion formed with a series of convolutions, and a lower composite laminate forming a collar-shaped support base portion sealingly enclosing a reinforcing substrate core of thin steel sheet. The flexible bellows portion of the boot has its lowermost convolute terminating in a groove positively defined in part by the substrate sheet dimensioned for releasable locking engagement of the bezel frame rectangular opening without requiring any separate fastening or support means. The bezel frame is formed with a peripheral downwardly directed continuous rib flange which is positioned at a predetermined height above the vehicle floor pan. Thus, upon locking attachment of the bezel frame on the boot composite base portion the surrounding vehicle floor carpet cut edges are captured and retained by the bezel frame rib flange.

BRIEF DESCRIPTION OF THE DRAWINGS

The present invention will be better understood by reference to the following detailed description of a preferred embodiment when read in conjunction with the accompanying drawings in which like reference characters refer to like parts throughout the view and in which:

FIG. 1 is a fragmentary perspective view of a portion of a vehicle passenger compartment showing an automotive transmission shift lever provided with the support boot cover and bezel frame arrangement of the present invention;

FIG. 2 is an exploded perspective view of the support cover boot and floor bezel arrangement of the invention including the pre-formed substrate steel sheet;

FIG. 3 is a fragmentary top elevational view of the shift lever with the composite cover boot and bezel arrangement of FIG. 1;

DETAILED DESCRIPTION OF THE INVENTION

Figure 4:
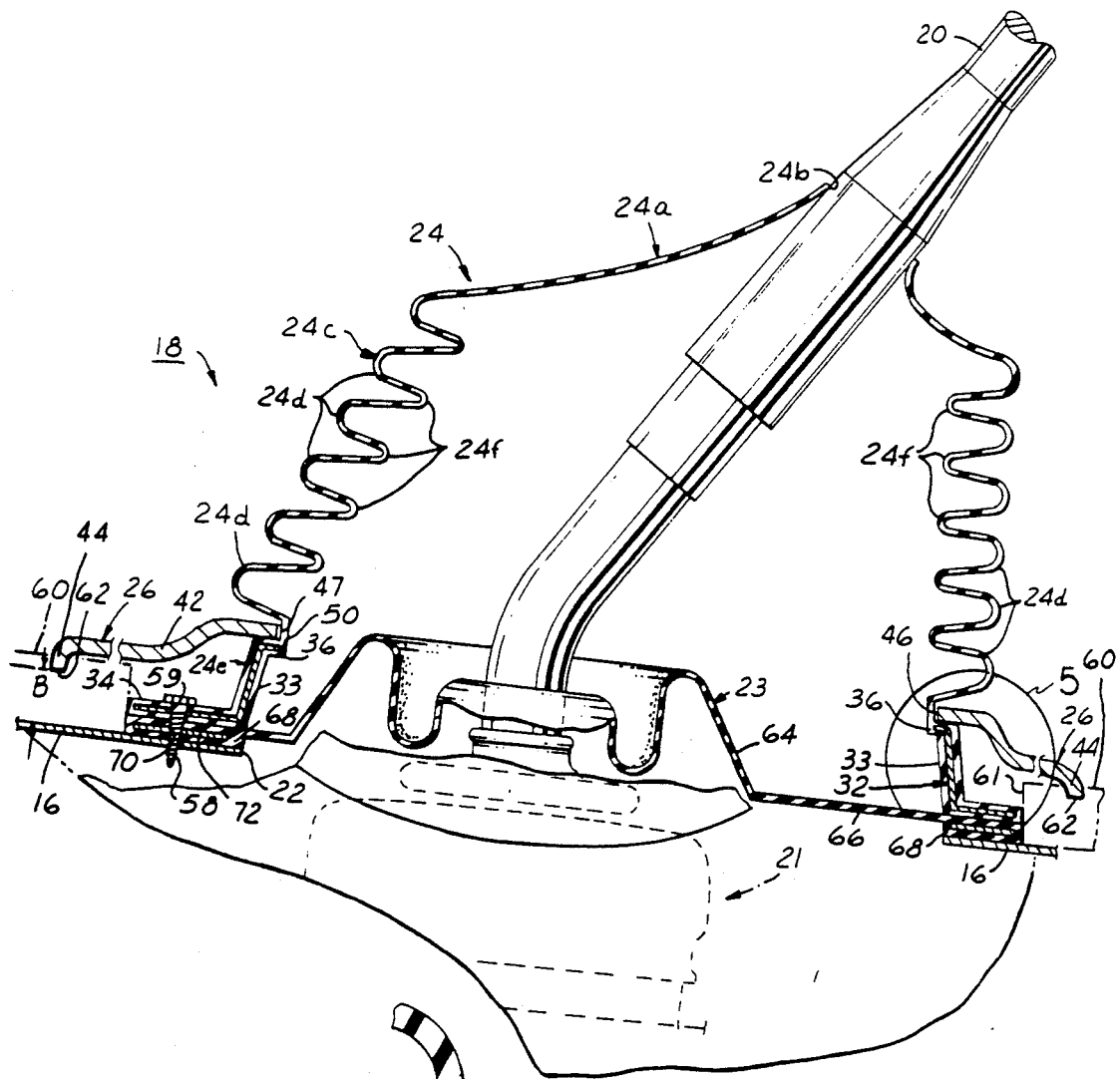
FIG. 4 is a fragmentary side sectional view, partly in elevation, of a shift lever taken substantially on the line 4—4 of FIG. 3.

Referring now to the drawings and more particularly to FIG. 1 there is shown a portion of the interior of a vehicle body passenger compartment 10 which includes an instrument panel structure 12. A front seat (not shown) is conventionally mounted on a carpeted floor having a raised longitudinal tunnel 14 formed with an upper rearwardly and laterally sloped floor portion 16 upon which a three piece gear shift lever and pivot mechanism cover assembly, generally indicated at 18, are supported. The cover assembly 18 comprises a decorative outer boot cover, an environmental inner boot seal, and bezel frame. A manual transmission gear shift lever, indicated at 20, projects upwardly and rearwardly from a pivot mechanism 21 (FIG. 4) through an access aperture 22 in wall portion 16. The pivot mechanism 21 is protected from the environment by the inner boot seal 23 formed of suitable elastomeric material such as rubber.

As best seen in FIG. 2 the outer boot cover is indicated generally at 24 while the bezel frame is indicated generally at 26. The boot cover 24 is formed of elastomeric material such as rubber while the bezel frame is preferably formed of suitable rigid sheet material such as plastic or metal. FIG. 3 is a top elevational view of the outer boot cover and floor bezel assembly 18.

Turning now to FIG. 4 it will be seen that the outer boot cover 24 comprises an upper flexible conical sleeve portion 24 "a" formed at its upper end having a circular passage 24 "b" through which the gear shift lever 20 extends. The outer boot cover 24 further comprises an intermediate generally frusto-conical shaped bellows portion 24 "c". The bellows portion 24 "c" is formed with plurality of surrounding convolutions, defining a series of outer crests 24 "d" and inner troughs 24 "f", a with each next subjacent convolution having a progressively larger outer surface. It will be noted that each convolution crest 24 "d" and trough 24 "f" is generally rectangular shaped as viewed in horizontal plan in FIG. 3.

Figure 5:
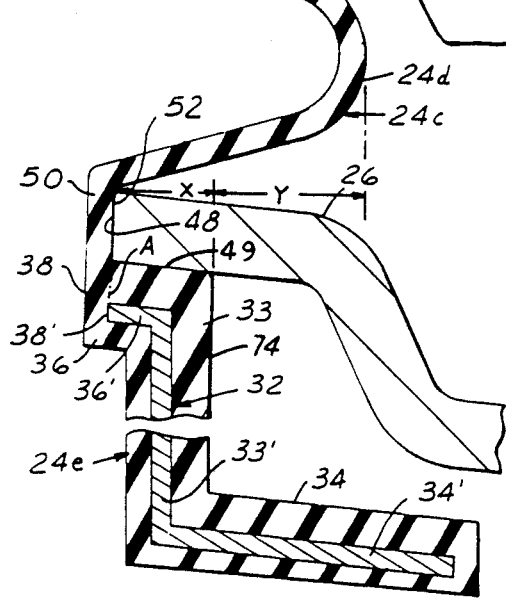
FIG. 5 is an enlarged fragmentary vertical sectional view of the portion within the dashed-line circle designated "FIG. 5" in FIG. 4.
Figure 6:
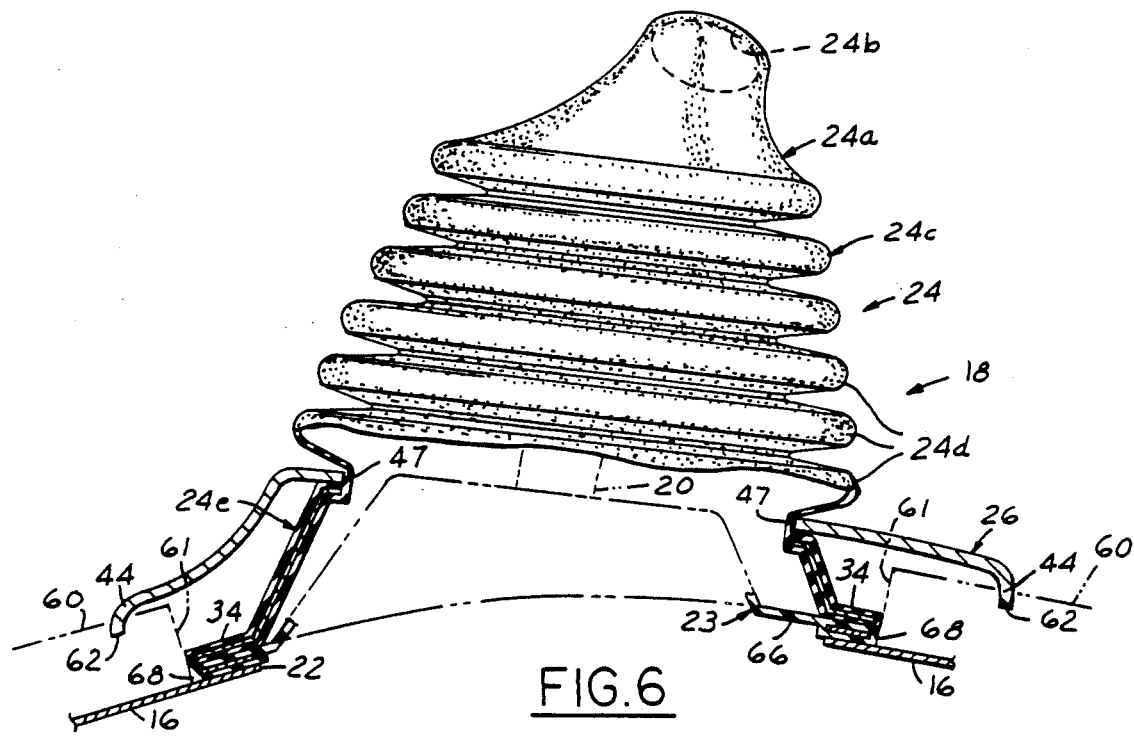
FIG. 6 is a fragmentary front elevational view of the shift lever, composite cover boot, and bezel frame of the invention.

The outer boot cover 24 terminates in a lower composite laminate base portion 24 "e" comprising a sheet-like core, shown in cross section in FIGS. 4 and 5. The composite laminate base portion 24 "e" has inner and outer elastomeric layers sealingly encapsulating, in a sandwiched manner, a substrate core reinforcement sheet member, generally indicated at 32, which in the preferred embodiment is stamped from sheet steel. As best seen in FIGS. 2 and 3 the composite laminate base portion 24 "e" has a predetermined configuration forming a rectangular-shaped collar having an upstanding wall portion 33 interconnecting a lower outwardly projecting base mounting flange 34 and an upper inwardly projecting stop flange 36. As seen in FIG. 2 the substrate core sheet member 32 is initially pre-formed with the identical predetermined configuration as the base portion 24 "e" prior to encapsulation. Thus, the substrate core sheet member 32 comprises an upstanding wall portion 33' interconnecting a lower outwardly projecting mounting base foot flange 34' and an upper inwardly projecting stop flange 36'.

Figure 7:
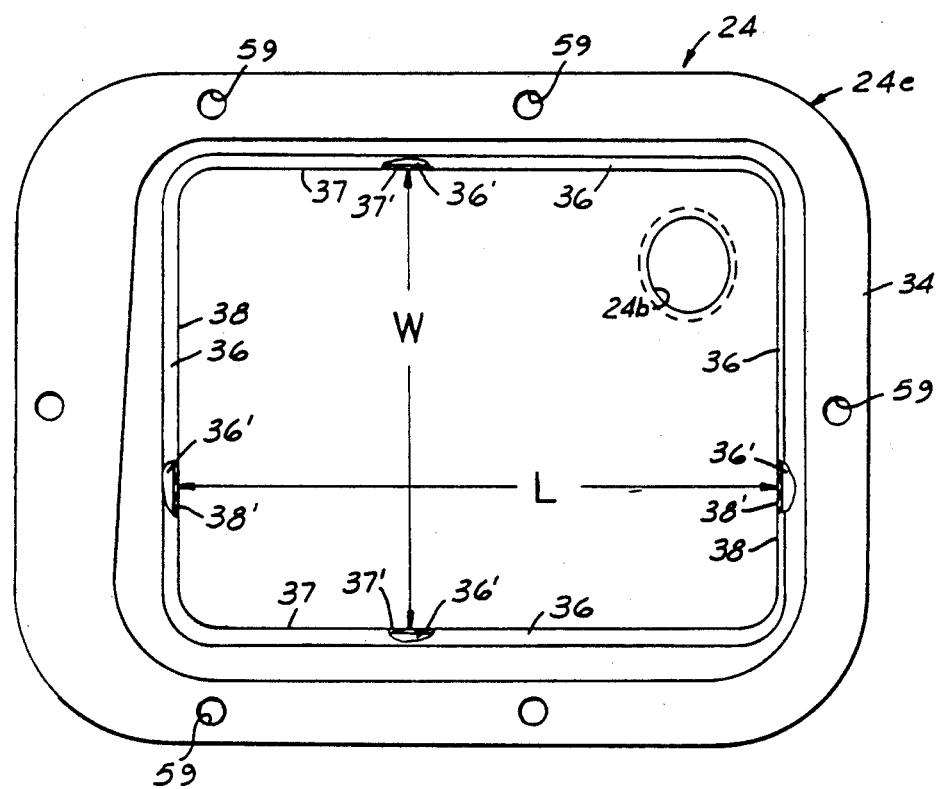
FIG. 7 is a bottom elevational detail view, with parts broken away, of the boot cover of FIG. 2.

FIG. 7 depicts the outer cover boot underside wherein the base portion stop flange 36 defines an internal rectangular opening with its longitudinal opposed internal edges 37 and transverse opposed internal edges 38 having a predetermined internal length "L" and internal width "W". It will be noted in FIG. 2 that the pre-formed substrate sheet member 32 is formed with a conforming rectangular opening 37', 38' having a predetermined length "L'" and internal width "W'" substantially equal to but slightly greater than the rectangular opening 37,38 caused by the added thickness of the base portion outer elastomeric coating.

As best seen in FIGS. 2 and 4 the bezel frame 26 is molded of suitable rigid plastic material having a generally planar rectangular frame-like configuration defining side frame portions 40 and end frame portions 42. The outer periphery of the frame portions terminate in a downwardly projecting continuous peripheral lip flange 44. The bezel frame 26 defines a central rectangular opening with longitudinal internal edges 47 and transverse internal edges 48. The bezel frame opening has a predetermined length "L" and width "W" substantially equal to but slightly larger than the corresponding length "L" and width "W" of the outer boot cover base portion internal rectangular opening 37,38 shown in FIG. 7.

With reference to FIGS. 4 and 5 it will be seen that the outer boot cover base portion stop flange 36 defines a reinforced horizontal stop shoulder 49. It will be noted in FIG. 5 that said stop shoulder 49 has a Further, the lowermost convolute defines, with peripheral transition planar side wall 50, a recess 52 adapted to lockingly receive the central aperture 47, 48 of the bezel frame 26. It will be noted in FIG. 5 that the substrate core sheet member 32 rectangular aperture rearward transverse edge 38' and the bezel frame rearward transverse edge 48 are located in a common vertically disposed transversely extending plane which includes construction line "A".

With reference to FIG. 4 it will be seen that outer boot cover 24 is initially secured over the opening 22 by locating its foot flange 34 on the wall portion 16. Suitable fasteners, such as threaded screws 58, are inserted in foot flange holes 59 and driven into aligned holes in the floor portion 16.

As seen in FIG. 4 a floor pan covering carpet 60 has a substantially rectangular shaped cutout 61 conforming to the perimeter of the foot flange shown in FIG. 7. The carpet 60 is thus installed prior to the attachment of the bezel frame 26 such that the outer periphery of the composite laminate base portion foot flange 34 is surrounded in substantially abutting relation by the carpet cutout 61. It will be noted that, upon attachment of the bezel, its peripheral downwardly projecting lip flange 44 free edge 62 is uniformly positioned a predetermined vertical distance "B" above the upper face of the wall portion 16. In this way the carpet 60 abutting internal edges 61 are clamped in place by the bezel frame downwardly projecting rib flange 44. This is automatically achieved upon the installer fitting the bezel frame downwardly over the boot cover flexible bellows portion 24 "c" for supporting contact with stop shoulder 49 upon snapping releasably locked engagement in the cover boot recess 52.

It will be seen in FIG. 4 that the inner seal boot 23 comprises a central circular bellows portion 64, an intermediate web portion 66, and a peripheral composite border flange 68. The border flange conforms to the foot flange 34 of the outer cover boot composite base portion 24 "e" and is sandwiched between the overlying foot flange 34 and the underlying wall portion 16. The border flange 68 is provided with aligned holes 70 for reception of the screws 58. Further the border flange 68 is molded with a reinforcement substrate core rectangular frame 72 made of suitable material, such as sheet steel.

It will be noted in FIG. 5 that the lower most convolute crest 24 "d" extends outwardly from the outer surface 74 of the base wall portion 33 a dimension "Y" at least equal to the width "X" of the groove 52. The extension of the lower most flexible crest in combination with the rigid stop flange 38 define the locking groove 52 for releasably engaging the bezel frame rectangular opening.

Although the present invention has been shown and described with reference to a preferred embodiment thereof, and in terms of the illustrated drawings, it should not be considered as limited thereby. Thus, various possible modifications, omissions, and alternatives could be conceived by one skilled in the art without departing from the scope of the present invention. Therefore, the scope of the invention should be defined solely by the scope of the appended claims which follow.

What is claimed is:

1. In an outer boot cover and bezel frame assembly for a floor mounted manually operated vehicle transmission pivotal gear shift lever extending upwardly from an opening in a generally horizontal floor portion, wherein an improved attaching arrangement for said assembly comprising:

a one-piece outer boot cover molded of elastomeric material having an upper flexible conical-shaped sheath portion tapering upwardly to a circular shift lever circular passage, an intermediate generally frusto-conical shaped flexible bellows portion formed with a plurality of convolutions having a generally rectangular shape in horizontal plan, each said bellows portion convolution having a generally rectangular outline in horizontal plan, and a lower composite laminated rigid base portion defined by a substrate core of sheet metal;

said composite rigid base portion in the shape of an upstanding collar interconnecting a lower outwardly projecting foot flange adapted to be secured to said floor portion and an upper inwardly projecting rigid stop flange, said stop flange having interior opposed longitudinal and transverse edges defining a rectangular shaped opening having a predetermined length and width;

said bellows portion having a series of flexible convolutions defined by alternating outer crests and inner troughs with the lower most crest terminating in a locking groove having a trough defined by planar upstanding flexible bight wall, said bight wall extending upwardly from said composite stop flange to its adjacent lower most convolute defining a predetermined groove height substantially equal to but slightly greater than the thickness of said bezel frame, with said bight wall having a rectangular exterior periphery determined by said rigid base portion stop flange rectangular shaped opening;

said bezel frame having a rectangular shape in plan and formed with a central rectangular shaped aperture having a predetermined length and width substantially equal to but slightly greater than the length and width, respectively, of said base portion central rectangular opening, whereby with said bezel frame central opening receiving said shift lever and boot cover therethrough such that said lowermost of bellows convolution outer crest portion being resiliently deformed inwardly enabling said bezel frame to be moved downwardly until said bezel frame being seated on said base portion stop flange with its rectangular opening releasably engaging said locking groove.

2. The outer boot cover and bezel frame attaching arrangement as set forth in claim 1, wherein said bezel frame periphery formed with a downwardly projecting lip flange located a predetermined vertical distance above said floor portion with said bezel frame supported on said stop flange, carpeting overlying said floor portion having a rectangular opening conforming to the periphery of said foot flange, said carpeting having a predetermined thickness greater than said lip flange predetermined distance above said floor portion located on said floor portion, whereby upon said bezel frame engaged in said locking groove said carpeting being releasably captured between said lip flange and said floor portion.

3. The outer boot cover and bezel frame attaching arrangement as set forth in claim 1, wherein said lower most convolute crest portion extends laterally outwardly a predetermined dimension beyond said transition wall at least equal to twice the width dimension of said stop flange so as to releasably engage said bezel frame in said locking groove.

4. The outer boot cover and bezel frame attaching arrangement as set forth in claim 1, wherein an inner seal boot is provided for sealing covering said floor opening.

* * * * *